United States Patent
Shkvarchuk et al.

(10) Patent No.: US 8,775,654 B2
(45) Date of Patent: Jul. 8, 2014

(54) APPARATUS AND METHODS FOR MEDIATING MESSAGES

(75) Inventors: Taras Shkvarchuk, Concord, CA (US); Paul Hinks, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 2055 days.

(21) Appl. No.: 10/742,513

(22) Filed: Dec. 19, 2003

(65) Prior Publication Data

US 2005/0138210 A1   Jun. 23, 2005

(51) Int. Cl.
*G06F 15/16* (2006.01)
*G06F 15/173* (2006.01)
*H04L 29/06* (2006.01)
*H04L 12/58* (2006.01)

(52) U.S. Cl.
CPC .............. *H04L 69/08* (2013.01); *H04L 69/22* (2013.01); *H04L 12/583* (2013.01)
USPC .......................................... 709/231; 709/224

(58) Field of Classification Search
CPC ....... H04L 69/08; H04L 69/22; H04L 12/583; H04L 12/5835; H04L 12/589; H04L 29/06027; H04L 51/063; H04L 51/066
USPC ................................................. 709/249, 238
See application file for complete search history.

(56) References Cited

U.S. PATENT DOCUMENTS

| | | | |
|---|---|---|---|
| 5,005,200 A | 4/1991 | Fischer | |
| 5,119,377 A | 6/1992 | Cobb et al. | |
| 5,157,726 A | 10/1992 | Merkle et al. | |
| 5,159,630 A | 10/1992 | Tseng et al. | |
| 5,222,234 A | 6/1993 | Wang et al. | |
| 5,224,166 A | 6/1993 | Hartman, Jr. | |
| 5,255,389 A | 10/1993 | Wang | |
| 5,311,438 A | 5/1994 | Sellers et al. | |
| 5,333,312 A | 7/1994 | Wang | |
| 5,513,323 A | 4/1996 | Williams et al. | |

(Continued)

FOREIGN PATENT DOCUMENTS

| | | |
|---|---|---|
| JP | 05-127961 A | 5/1993 |
| JP | 09-179760 A | 7/1997 |

(Continued)

OTHER PUBLICATIONS

Harding et al. "MIME-based Secure Peer-to-Peer Business Data Interchange over the Internet" RFC: 3335, Sep. 2002, pp. 1-28.*

(Continued)

*Primary Examiner* — Karen Tang
(74) *Attorney, Agent, or Firm* — Haynes Beffel & Wolfeld LLP; Ernest J. Beffel, Jr.

(57) ABSTRACT

Disclosed are methods and apparatus for effectively mediating communications between entities in a computer network. In general, a format preference for a first service is received into a message interchange network. The format preference specifies an expected format for messages received by such first service without specifying a format for any other services. The format preference for the first service is then stored in a repository associated with the message interchange network. Messages sent to the first service are then mediated using the format preference stored for the first service so that the first service receives messages in the expected format specified by the format preference stored for the first service.

61 Claims, 7 Drawing Sheets

(56) References Cited

U.S. PATENT DOCUMENTS

| | | | |
|---|---|---|---|
| 5,557,798 A | 9/1996 | Skeen et al. | |
| 5,784,566 A | 7/1998 | Viavant et al. | |
| 5,790,677 A | 8/1998 | Fox et al. | |
| 5,812,669 A | 9/1998 | Jenkins et al. | |
| 5,826,017 A * | 10/1998 | Holzmann | 709/230 |
| 5,850,518 A | 12/1998 | Northrup | 395/200.33 |
| 5,903,652 A | 5/1999 | Mital | |
| 5,941,945 A | 8/1999 | Aditham et al. | |
| 6,049,785 A | 4/2000 | Gifford | |
| 6,065,082 A | 5/2000 | Blair et al. | |
| 6,072,942 A | 6/2000 | Stockwell et al. | |
| 6,091,714 A | 7/2000 | Sensel et al. | |
| 6,115,744 A | 9/2000 | Robins et al. | |
| 6,125,391 A | 9/2000 | Meltzer et al. | |
| 6,148,290 A | 11/2000 | Dan et al. | |
| 6,243,747 B1 | 6/2001 | Lewis et al. | |
| 6,269,380 B1 | 7/2001 | Terry et al. | |
| 6,304,969 B1 | 10/2001 | Wasserman et al. | |
| 6,332,163 B1 | 12/2001 | Bowman-Amuah | |
| 6,336,135 B1 | 1/2002 | Niblett et al. | |
| 6,356,529 B1 * | 3/2002 | Zarom | 370/231 |
| 6,389,533 B1 | 5/2002 | Davis et al. | |
| 6,393,442 B1 | 5/2002 | Cromarty et al. | |
| 6,397,254 B1 | 5/2002 | Northrup | 709/227 |
| 6,421,705 B1 | 7/2002 | Northrup | 709/203 |
| 6,425,119 B1 | 7/2002 | Jones et al. | |
| 6,434,628 B1 | 8/2002 | Bowman-Amuah | |
| 6,438,594 B1 | 8/2002 | Bowman-Amuah | |
| 6,449,634 B1 * | 9/2002 | Capiel | 709/206 |
| 6,463,460 B1 | 10/2002 | Simonoff | |
| 6,470,357 B1 | 10/2002 | Garcia, Jr. et al. | |
| 6,470,385 B1 | 10/2002 | Nakashima et al. | |
| 6,493,758 B1 | 12/2002 | McLain | |
| 6,499,108 B1 | 12/2002 | Johnson | |
| 6,526,044 B1 | 2/2003 | Cookmeyer et al. | |
| 6,529,489 B1 | 3/2003 | Kikuchi et al. | |
| 6,538,673 B1 | 3/2003 | Maslov | |
| 6,546,413 B1 | 4/2003 | Northrup | 709/200 |
| 6,578,076 B1 | 6/2003 | Putzolu | |
| 6,587,466 B1 | 7/2003 | Bhattacharya et al. | |
| 6,601,082 B1 | 7/2003 | Durham et al. | |
| 6,636,889 B1 | 10/2003 | Estrada et al. | |
| 6,643,650 B1 | 11/2003 | Slaughter et al. | |
| 6,671,695 B2 | 12/2003 | McFadden | |
| 6,671,713 B2 | 12/2003 | Northrup | 709/203 |
| 6,671,746 B1 | 12/2003 | Northrup | 712/200 |
| 6,684,214 B2 | 1/2004 | Bata et al. | |
| 6,704,768 B1 | 3/2004 | Zombek et al. | |
| 6,718,380 B1 | 4/2004 | Mohaban et al. | |
| 6,789,077 B1 | 9/2004 | Slaughter et al. | |
| 6,850,979 B1 | 2/2005 | Saulpaugh et al. | |
| 6,868,143 B1 * | 3/2005 | Menon et al. | 379/88.13 |
| 6,868,401 B1 | 3/2005 | Carpenter et al. | |
| 6,868,447 B1 | 3/2005 | Slaughter et al. | |
| 6,874,011 B1 * | 3/2005 | Spielman et al. | 709/206 |
| 6,885,736 B2 * | 4/2005 | Uppaluru | 379/88.17 |
| 6,892,376 B2 | 5/2005 | McDonald et al. | |
| 6,898,618 B1 | 5/2005 | Slaughter et al. | |
| 6,917,976 B1 | 7/2005 | Slaughter et al. | |
| 6,918,084 B1 | 7/2005 | Slaughter et al. | |
| 6,925,595 B1 * | 8/2005 | Whitledge et al. | 715/234 |
| 6,948,063 B1 | 9/2005 | Ganesan et al. | |
| 6,950,875 B1 | 9/2005 | Slaughter et al. | |
| 6,961,760 B2 | 11/2005 | Li et al. | |
| 6,980,993 B2 | 12/2005 | Horvitz et al. | |
| 6,990,513 B2 | 1/2006 | Belfiore et al. | |
| 7,007,032 B1 | 2/2006 | Chen et al. | |
| 7,013,426 B1 | 3/2006 | Ingersoll | |
| 7,047,488 B2 | 5/2006 | Ingersoll et al. | |
| 7,072,983 B1 * | 7/2006 | Kanai et al. | 709/246 |
| 7,082,532 B1 * | 7/2006 | Vick et al. | 713/155 |
| 7,100,195 B1 | 8/2006 | Underwood | |
| 7,127,613 B2 | 10/2006 | Pabla et al. | |
| 7,152,204 B2 | 12/2006 | Upton | |
| 7,219,223 B1 | 5/2007 | Bacchus et al. | |
| 7,225,460 B2 | 5/2007 | Barzilai et al. | |
| 7,249,176 B1 | 7/2007 | Salas et al. | |
| 7,249,195 B2 | 7/2007 | Panec | |
| 7,254,614 B2 * | 8/2007 | Mulligan et al. | 709/207 |
| 7,305,454 B2 | 12/2007 | Reese et al. | |
| 7,340,508 B1 | 3/2008 | Kasi et al. | |
| 7,363,650 B2 | 4/2008 | Moriconi et al. | |
| 7,448,046 B2 | 11/2008 | Navani et al. | |
| 7,458,018 B2 | 11/2008 | Jones et al. | |
| 7,496,649 B2 | 2/2009 | Lee, IV et al. | |
| 7,546,629 B2 | 6/2009 | Albert et al. | |
| 7,574,511 B2 | 8/2009 | Pujol et al. | |
| 7,590,685 B2 | 9/2009 | Palmeri et al. | |
| 7,644,170 B2 * | 1/2010 | Clarke et al. | 709/230 |
| 7,703,008 B2 | 4/2010 | Ingersoll et al. | |
| 7,725,605 B2 | 5/2010 | Palmeri et al. | |
| 7,739,351 B2 | 6/2010 | Shkvarchuk et al. | |
| 7,802,007 B2 | 9/2010 | Reese | |
| 2002/0013854 A1 | 1/2002 | Eggleston et al. | |
| 2002/0038336 A1 | 3/2002 | Abileah et al. | |
| 2002/0059425 A1 | 5/2002 | Belfiore et al. | |
| 2002/0116454 A1 * | 8/2002 | Dyla et al. | 709/203 |
| 2002/0169803 A1 | 11/2002 | Sampath et al. | |
| 2002/0194181 A1 | 12/2002 | Wachtel | |
| 2002/0194227 A1 | 12/2002 | Day et al. | |
| 2003/0041178 A1 | 2/2003 | Brouk et al. | |
| 2003/0046583 A1 | 3/2003 | Goldman et al. | |
| 2003/0050800 A1 | 3/2003 | Brandt et al. | |
| 2003/0058277 A1 | 3/2003 | Bowman-Amuah | |
| 2003/0079029 A1 | 4/2003 | Garimella et al. | |
| 2003/0097447 A1 | 5/2003 | Johnston | |
| 2003/0115179 A1 | 6/2003 | Prabakaran et al. | |
| 2003/0163726 A1 | 8/2003 | Kidd | |
| 2003/0208505 A1 | 11/2003 | Mullins et al. | |
| 2004/0019696 A1 * | 1/2004 | Scott et al. | 709/242 |
| 2004/0117428 A1 * | 6/2004 | Surma et al. | 709/200 |
| 2004/0162741 A1 | 8/2004 | Flaxer et al. | |
| 2004/0162918 A1 * | 8/2004 | Freidman et al. | 709/246 |
| 2004/0167986 A1 * | 8/2004 | Gilfix et al. | 709/230 |
| 2004/0205216 A1 * | 10/2004 | Ballinger et al. | 709/231 |
| 2005/0039040 A1 * | 2/2005 | Ransom et al. | 713/200 |
| 2005/0071266 A1 | 3/2005 | Eder | |
| 2005/0080914 A1 | 4/2005 | Lerner et al. | |
| 2005/0086360 A1 | 4/2005 | Mamou et al. | |
| 2005/0086594 A1 * | 4/2005 | Schlimmer et al. | 715/515 |
| 2005/0198121 A1 | 9/2005 | Daniels et al. | |
| 2005/0204048 A1 | 9/2005 | Pujol et al. | |
| 2005/0228863 A1 | 10/2005 | Palmeri et al. | |
| 2005/0234928 A1 | 10/2005 | Shkvarchuk | |
| 2005/0256934 A1 * | 11/2005 | Motoyama | 709/208 |
| 2006/0015353 A1 | 1/2006 | Reese | |
| 2006/0031225 A1 | 2/2006 | Palmeri et al. | |
| 2006/0069717 A1 | 3/2006 | Mamou et al. | |
| 2006/0173951 A1 * | 8/2006 | Arteaga et al. | 709/203 |
| 2008/0184265 A1 | 7/2008 | Kasi et al. | |
| 2010/0041380 A1 * | 2/2010 | Hewes et al. | 455/414.4 |
| 2010/0205522 A1 | 8/2010 | Ingersoll et al. | |
| 2010/0223301 A1 | 9/2010 | Shkvarchuk et al. | |
| 2010/0235445 A1 | 9/2010 | Palmeri et al. | |
| 2011/0060842 A1 | 3/2011 | Reese | |

FOREIGN PATENT DOCUMENTS

| | | |
|---|---|---|
| JP | 11-143753 A | 5/1999 |
| WO | 00/46732 A1 | 8/2000 |
| WO | 200125954 A2 | 4/2001 |
| WO | 01/33369 A1 | 5/2001 |

OTHER PUBLICATIONS

Nichol et al, "Re:Convert DIME to SoW/MIME" Sep. 2002, p. 1-12.*

"Coblist:-Cob: Welcome to my photo album!," Sep. 2000.

"Evite.com launches Free web based group activity organizer," PR Newswire, Jul. 1999.

"Evite Relies on MySQL to Deliver Millions of Invitations," Morelock.

"Evite Tour," Evite, Mar. 2001.

(56) References Cited

OTHER PUBLICATIONS

Excite@Home *Excites #1 webshots provides users with comprehensive photo capabilities; unveiling "My Photos" wherein excite uses can create personal albulms, share photos, search photos and order quality prints by Ofoto,"* Jorgensen, Mr Presswire, Jun. 2000.
"SML: Simplifying XML." Robert E. La Quey, Nov. 1999.
Greef, Arthur, "Partner Interface Process Technical Architecture", © 1998, RossettNet/PIP Technical Architecture.doc, pp. 1-12.
Stross, Kenneth, "Managed B2B Infrastructure Technical Architecture", © Jul. 31, 2000, Transact Technical Architecture, pp. 1-14.
"A Global Infrasture for the Guaranteed Delivery of B2B Transactions over the Internet", Slam Dunk Networks, © 2000, pp. 1-18.
ipo.com—Venture, Internet Document, URL:http://www.ipo.com/venture/pcprofile.asp?p+IPO&pc+20323, p. 1.
CrossWeave Company, Internet Document, © 2001, URL:http://www.crossweave.com/company_overview.html, p. 1.
GlueCode/Our Mission Vision, Internet Document, URL:http://www.gluecode.com/company/mission_vision.html, p. 1.
Viquity/Press Release, "Viquity Demonstrates Power of Hub Technology in ebXNL Proof-of-Concept", Dec. 12, 2000, pp. 1-2.
Festa, Paul, "Start-up gains Netscape funding, Microsoft engineers", NET News.com, Sep. 10, 2000, pp. 1-2.
Moberg, Dale and Drummond, Rik (2005) Mime-Based Secure Peer-to-Peer Business Data Interchange Using HTTP, Applicability Statement 2 (AS2); Network Working Group, Request for Comments: 4130, Category: Standards Track, Copyright The Internet Society, Jul. 2005.
US Office Action Final dated Aug. 4, 2008 issued in U.S. Appl. No. 10/858,709.
US Office Action dated Nov. 14, 2007 issued in U.S. Appl. No. 10/858,709.
US Office Action dated Feb. 5, 2008 issued in U.S. Appl. No. 10/820,650.
US Office Action dated Oct. 28, 2008 issued in U.S. Appl. No. 10/820,650.
US Office Action dated Dec. 6, 2007 issued in U.S. Appl. No. 10/808,212.
US Office Action Final dated Aug. 7, 2008 issued in U.S. Appl. No. 10/808,212.
US Office Action dated Jan. 8, 2009 issued in U.S. Appl. No. 10/858,709.
US Office Action Final dated Aug. 19, 2009 issued in U.S. Appl. No. 10/858,709.
US Office Action dated Feb. 5, 2010 issued in U.S. Appl. No. 10/858,709.
US Notice of Allowance dated Mar. 13, 2009 issued in U.S. Appl. No. 10/820,650.
US Notice of Allowance dated Jun. 18, 2009 issued in U.S. Appl. No. 10/820,650.
US Office Action dated Mar. 13, 2009 issued in U.S. Appl. No. 10/808,212.
US Notice of Allowance dated Sep. 21, 2009 issued in U.S. Appl. No. 10/808,212.
US Supplemental Notice of Allowability and Examiner Interview Summary dated Dec. 2, 2009 issued in U.S. Appl. No. 10/808,212.
US Notice of Allowance dated Feb. 5, 2010 issued in U.S. Appl. No. 10/808,212.
US Office Action dated Mar. 4, 2009 issued in U.S. Appl. No. 10/849,602.
US Office Final Action dated Sep. 17, 2009 issued in U.S. Appl. No. 10/849,602.
US Examiner Interview Summary dated Dec. 15, 2009 issued in U.S. Appl. No. 10/849,602.
US Notice of Allowance dated May 6, 2010 issued in U.S. Appl. No. 10/849,602.
US Office Action dated Feb. 2, 2009 issued in U.S. Appl. No. 11/016,566.
US Office Action Final dated Jul. 15, 2009 issued in U.S. Appl. No. 11/016,566.
US Notice of Allowance date Dec. 24, 2009 issued in U.S. Appl. No. 11/016,566.
U.S. Appl. No. 12/777,164, filed May 10, 2010, Shkvarchuk et al.
U.S. Appl. No. 12/753,709, filed Apr. 2, 2010, Palmeri et al.
US Office Action Final dated Aug. 20, 2010 issued in U.S. Appl. No. 11/014,149.
US Office Action Final dated Sep. 8, 2010 issued in U.S. Appl. No. 10/858,709.
US Advisory Action dated Dec. 2, 2010 issued in U.S. Appl. No. 10/858,709.
US Miscellaneous Communication (Notice of Non-Compliant Information Disclosure Statement) dated Aug. 10, 2010 issued in U.S. Appl. No. 10/849,602.
US Office Action dated Oct. 29, 2010 issued in U.S. Appl. No. 12/753,709.
Open Applications Group White Paper Document No. 20010301, Best Practices and XML Content for eBusiness and Application Integration, OAGIS Extensions Release 1.1, 2001, pp. 1-34.
Salz, R., O'Reilly, xml.com: Examining WSDL, May 15, 2002, available at http://www.xml.com/pub/a/2002/05/15/ends.html, 5 pgs.
WebServices Framework & Assertion Exchange Using SAML, 5 pages, http://www.w3.org/2001/03/WSWS-popa/paper23/, printed Sep. 11, 2002.
Cover Pages: Web Services Description Language (WSDL), Technology Reports, 31 pages, Jul. 9, 2002, located at http://xml.coverpages.org/wsdl.html.
K. Narayanaswamy, K.V. Bapa Rao, "An Incremental Mechanism for Schema Evolution in Engineering Domains", IEEE 1988, pp. 294-300.
Editors: Paul V. Biron and Ashok Malhotra, "XML Schema Part 2: Datatypes", World Wide Web Consortium Working Draft May 6, 1999, W3C XP-002203860, available at http://www.w3.org/1999/05/06-xmlschema-2, 1-28.
Kent Brown, "BizTalk: Fluent in E-Business", XP-002203861, 1-6, Dec. 1999.
Arkin, Assaf et al., "Web Service Choreography Inteface 1.0", Aug. 8, 2002, http://www.w3.org/TR/wsci/.
Cabrera, Felipe et al. "Specification: Web Services Transaction (WS-Transaction)", Aug. 9, 2002, http://www.ibm.com/developerworks/library/ws-transpec.
Glushko article: Advanced Technology Program Close Out Performance Report: Project Title: Component-Based Commerce: The Interoperable Future, Apr. 14, 2000, 8 pages.
Glushko article: ATP Close Out Performance Report: Component-Based Commerce: The Interoperable Future, 9th Revision, modified Jan. 31, 2000, 57 pages.
Editors: Dan Brickley and R.V. Guha, Resource Description Framework (RDF) Schema Specification, W3C Proposed Recommendation Mar. 3, 1999, W3C XP-002203858, available at http://www.w3.org/TR/1999/PR-rdf-schema-19990303, 1-29.
Editors: David Beech et al., "XML Schema Part 1: Structures", W3C Working Draft May. 6, 1999, W3C XP-002203859, available at http://www.w3.org/1999/05/06-xmlschema-1, 1-53.
W. Yeong, T. Howes, S. Kille, "Lightweight Directory Access Protocol", ISODE Consortium, Mar. 1995, pp. 1-19.
Nils Klarlund, Anders Moller, Michael I. Schwartzbach, "Document Sructure Description 1.0", AT&T and BRICS 1999, XP-002203865, pp. 1-34.
US Office Action dated Apr. 27, 2011 issued in U.S. Appl. No. 10/858,709.
US Office Action Final dated Feb. 1, 2012 issued in U.S. Appl. No. 10/858,709.
US Office Action dated Dec. 22, 2011 issued in U.S. Appl. No. 12/777,164.
US Office Action Final dated Apr. 15, 2011 issued in U.S. Appl. No. 12/753,709.
US Office Action dated Sep. 26, 2011 issued in U.S. Appl. No. 12/753,709.
W. Yeong, T. Howes, S. Kille, "Lightweight Directory Access Protocol", ISODE Consortium, Mar. 1995, 1-19.
B. Omelayenko, D. Fensel, "Scalable Document Integration for B2B Electronic Commerce", Special Issue of Electronic Commerce Research Journal onn B2B Research, Sep. 12, 2001, pp. 1-31.

* cited by examiner

APPARATUS AND METHODS FOR MEDIATING MESSAGES

BACKGROUND OF THE INVENTION

The present invention relates to methods and apparatus for processing data within a computer network. More specifically, it relates to mediating messages within such computer network.

Corporate reliance on technology has become more complex and more pervasive. Increasingly, companies are identifying opportunities to extend their core business or cut costs using the Internet. Both trends have put increasing priority on integrating disparate business applications. For this reason, enterprise application integration (EAI) has emerged as a solution for allowing information technology departments to build bridges that are designed to unify their legacy systems into a single enterprise application. Ideally, the creation of this single enterprise application would not require sweeping changes to the underlying structures.

EAI suppliers typically offer end point solutions for managing business process interactions between end points within a computer network. Although a specific enterprise software package may be designed to transparently handle diverse business processes carried out by two or more end nodes, each specific enterprise software package requires releasing customized connectors or adapters which will work for the specific business processes and applications used by the specific end nodes. As a result, these enterprise solutions are not easily scalable. Additionally, scores of adapters need to be built for each vendor (e.g., Oracle, SAP and Peoplesoft). As each supplier releases new versions of their software, EAI vendors find themselves unable to gain traction under the burden of supporting their existing adapters.

Notwithstanding the benefits of EAI, the software costs and resource investments of EAI prevent small-to-medium enterprise (SME) customers from embracing EAI solutions. For SMEs, reliance on web service providers represents an increasingly attractive alternative.

The web service provider market is one of the fastest growing segments of the software industry. Service providers make enterprise applications (e.g., human resources administration, recruiting, travel and expense management, sales force automation) available to customers over the web at a server device. Those applications are fully managed and hosted by the provider, providing significant cost savings to enterprises.

Some providers merely host and manage third-party packaged software for their customers ("managed hosters"). Others build new applications from the ground up to take advantage of the benefits and cost-savings of web service provider model. Service providers enjoy the profit margins and operational scalability of consumer Web companies like eBay and Yahoo, while at the same time offering the feature sets of complex enterprise software applications such as PeopleSoft and Siebel.

Although the service provider approach allows a single business to set up a host server for allowing itself and its business partners to use third party or custom applications, this approach does not allow the set up and dismantling of complex arrangements between business partners. Specifically, this approach requires custom set ups when business partners use different formats for their messages and other communications. Using these custom set ups, business partners specify the format of outgoing messages to comport with the recipient's format requirements. These messages can then be delivered to a recipient in a format understandable to the recipient. According to this approach, business entities must keep track of formatting requirements of each of their recipient business partners, which can be costly and time-consuming.

In view of the above, there is a need for facilitating communications between diverse business entities in a scalable manner. In other words, mechanisms for efficiently and reliably mediating communications between business entities (as well as other entity types) is needed.

SUMMARY OF THE INVENTION

Accordingly, the present invention provides methods and apparatus for effectively mediating communications between entities or services. In general, a plurality of services is provided and accessible through a message interchange network. For a particular service, an expected format is specified for messages received into such particular service. The message interchange network retains the expected format of the particular service. The message interchange network may also retain the expected formats for any number of services. Thus, when a message is received into the message interchange network destined for a particular service, the message interchange network translates the message if the message's format differs from the expected format for such particular service. Thus, the only information that needs to be specified for a particular service is the expected format for messages received into such particular service. That is, in order for a particular service to interact with other services, the formats used by other services do not need be specified by the particular service.

One aspect of this invention pertains to a method of mediating messages within a computer network. This method may be characterized by the following sequence of operations: (a) receiving a format preference for a first service into a message interchange network, wherein the format preference specifies an expected format for messages received by such first service without specifying a format for any other services; (b) storing the format preferences in a repository associated with the message interchange network; and (c) mediating messages sent to the first service using the format preference stored for the first service so that the first service receives messages in the expected format specified by the format preference stored for the first service.

Another aspect of this invention pertains to a computer system operable to mediate encoded messages within a computer network. Such system may be characterized by the following features: one or more processors; one or more memory devices, wherein at least one of the processors and memory devices are adapted for: (a) receiving a format preference for a first service into a message interchange network, wherein the format preference specifies an expected format for messages received by such first service without specifying a format for any other services; (b) storing the format preferences in a repository associated with the message interchange network; and (c) mediating messages sent to the first service using the format preference stored for the first service so that the first service receives messages in the expected format specified by the format preference stored for the first service.

Yet another aspect of the invention pertains to computer program products including machine-readable media on which are stored program instructions for implementing a portion of or an entire method as described above. Any of the methods of this invention may be represented, in whole or in part, as program instructions that can be provided on such computer readable media. In addition, the invention pertains to various combinations of data generated and/or used as described herein.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1A:
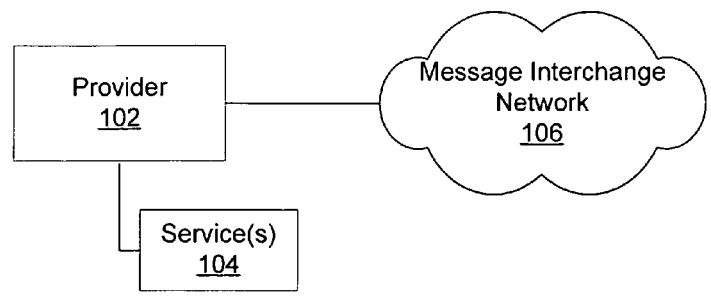
FIG. 1A illustrates the provisioning of a service for use over a public network in accordance with one embodiment of the present invention.

FIG. 1A illustrates the provisioning of a service for use over a public network in accordance with one embodiment of the present invention. As shown, the public network includes a message interchange network 106 for facilitating the provisioning of services for use by any suitable entity. In a specific example, a service 104 is being provisioned by a Provider 102 with the message interchange network 106. During the provisioning process, a format preference may be specified for messages received by the service 104 as further described below. In one embodiment, provisioning includes setting up a service configuration such that the service may be used in the network. As part of this set up, the service can specify the type of message format that it prefers to receive.

In the present embodiment, the Provider 102 may optionally specify which users or services may access the provisioned service 104. It should be recognized that the service 104 can be provided by Provider 102 to any type of entity, such as a user or individual entity from a particular organization or a particular organization entity.

In one embodiment, Provider 102 is an organization administrator from an organization. An organization may represent a distinct business entity, a particular user of the same business entity, or an administrative domain of a computer application. In this example, Provider 102 represents a person. In another embodiment, Provider 102 could itself be a service or computer application.

A service may represent any computer application, process, entity, or device accessible to other applications, processes, entities, or devices through an interface such as an application programming interface (API), user interface, e.g., a graphical user interface, or Internet web user interface by any of a variety of protocols over a network within an entity or over the public Internet. A service may also be comprised of multiple methods or applications on a single device or distributed across multiple devices.

Although not shown, the Provider 102 may provision any number and type of services. Also, any number and type of Providers may provision services with the message interchange network 106. Accordingly, the message interchange network 106 is configured to provision multiple services from multiple Providers.

Several embodiments of mechanisms and techniques for provisioning services are described in U.S. patent application Ser. No. 09/820,966, entitled "SYSTEM AND METHOD FOR ROUTING MESSAGES BETWEEN APPLICATIONS", filed Mar. 30, 2001 by Lev Brouk et al. and U.S. patent application Ser. No. 10/727,089, filed 2 Dec. 2003, entitled "APPARATUS AND METHODS FOR PROVISIONING SERVICES," by David Byrne Reese et al., which applications are hereby incorporated by reference in their entirety for all purposes. Any of the provisioning mechanisms described in these referenced applications may easily be applied with the mediation techniques described herein.

After services are provisioned with respect to message interchange network 106, messages may then be sent between two or more services. That is, a particular service may be accessed by another service. By way of example, a user on a first device may access a particular service on a second device through a communication process (or service) located on their own first device.

Figure 1B:
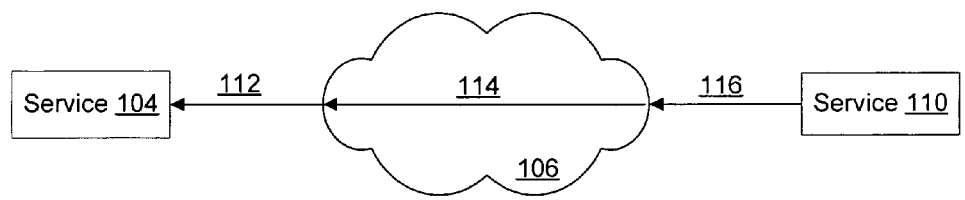
FIG. 1B illustrates the mediation of messages sent from a first service to a second service via message interchange network in accordance with one embodiment of the present invention.

FIG. 1B illustrates the mediation of messages sent from a first service to a second service via message interchange network in accordance with one embodiment of the present invention. As shown, a message is being sent from service 110 to service 104 through message interchange network 106. The message interchange network 106 is accessible over a public network, such as the Internet. For example, a user (not shown) may make a request to service 104 which resides on a remote device. The request may be sent to the service 104 by a web application (e.g., service 110) located on another remote device. In particular cases, the services may be configured to execute on their own and a user is not required to send a request or message to a particular service.

In one configuration of the present invention, the message interchange network 106 includes any number of mechanisms for mediating communications between two or more services. In the illustrated embodiment, the message interchange network 106 includes a mechanism for translating messages sent between the services, such as from service 110 to service 104. Messages can use formats such as MIME, DIME, and the like, with AS2, SOAP, and other application bindings. MIME and DIME are attachment/part formats, while SOAP and AS2 are application logic binding protocols. Of course, a message may use any suitable type of protocol, structuring, or formatting specification which results in a particular format for the message. When different entities use different formats for their messages, the message interchange network can translate messages such that recipients receive the messages in a proper format.

In the illustrated embodiment, a message having a MIME format is sent by service 110 and received into the message interchange network 106 via path 116. Of course, the routing path 116 may include any number and type of routers and/or processing nodes. The message interchange network 106 can then determine that service 104 expects messages to be received in a DIME format and translate the message from MIME to DIME format along path 114. The path 114 may include any number and type of routing devices (or services) and/or processing device (or services). The translated message, which now has a DIME format, is then sent to service 104 via path 112, which may include any suitable number and type of routing devices and/or processing nodes. In the preceding discussion, Service 110 and the provider of service 110 need not be aware of the message format requirements of the message destination (service 104), nor of any format translation processing taking place in the message interchange network. Service 110 may send the message as if service 104 accepted the same message format as used by service 110. A more detailed discussion of exemplary processes for mediating messages in different formats is provided below with regard to FIGS. 2-6.

In addition to providing mechanisms for provisioning services and mediating messages sent to such services, the message interchange network 106 also preferably includes a repository for storing various information regarding the services and entities which provision and/or use such services. The message interchange network preferably also includes mechanisms for creating services, registering users and their identifying information, and handling messages routed between services and/or users. The repository may be formed from one or more databases stored on one or more memory devices on one or more computer systems.

Figure 2:
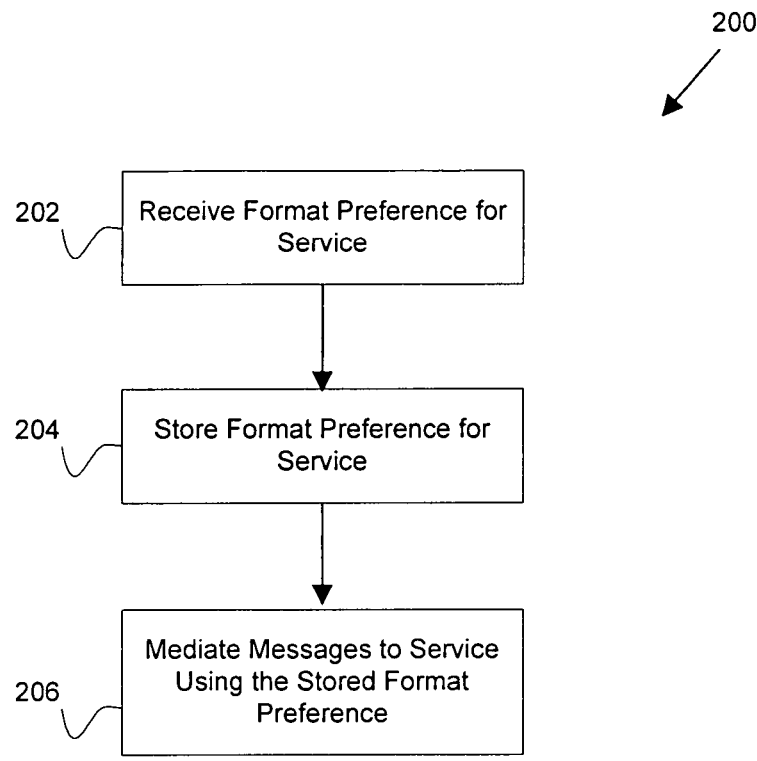
FIG. 2 is a flowchart illustrating a procedure for mediating messages between services in accordance with one embodiment of the present invention.

FIG. 2 is a flow process diagram illustrating one example of a technique for mediating messages sent to a particular service through a message interchange network. According to various embodiments, a message interchange network allows communication over a public network between services that may use different formats. At 202, a format preference for a particular service is received. The format preference may include message format information indicating how messages should be received by that particular service. According to various embodiments, a message may incorporate any of the following format types: Direct Internet Message Encapsulation (DIME), Multipurpose Internet Mail Encapsulation (MIME), Simple Object Access Protocol (SOAP), or AS2, as well as any other protocols or format types.

The format preferences for the first service may be received in a variety of ways. In one example, format preference information is received over a public network from a provider provisioning a service with the message interchange network. In the example of FIG. 1, when Provider 102 provisions service 104 with message interchange network 106, the Provider 102 specifies a format preference for messages received by such service 104. According to various embodiments, format information is received when a provider or a service is introduced into a network. In another embodiment, format information is received when a provider or service is configured for operation with a message interchange network. In a preferred embodiment, a provider specifies only a format preference. The provider does not need to perform any other actions, such as configuring transformation mappings, specifying translation processes, setting up routing to format conversion services, etc.

At 206, the format preference information for the particular service is stored and associated with such particular service. Information can be stored in a variety of ways or in any number and type of storage devices, such as one or more databases, caches, or data structures. In one instance, format preference information is stored in a message interchange network database. In another instance, format preference information can be stored at another network entity associated with the message interchange network. In a specific implementation, a format table is used to store entries regarding each service and its associated format preference.

At 208, messages sent to the particular service are mediated using the format preference stored for the particular service, as described in more detail below with regard to FIGS. 3 through 6. In the example of FIG. 1, the message interchange network 106 mediates messages sent to service 104 by service 110.

Figure 3:
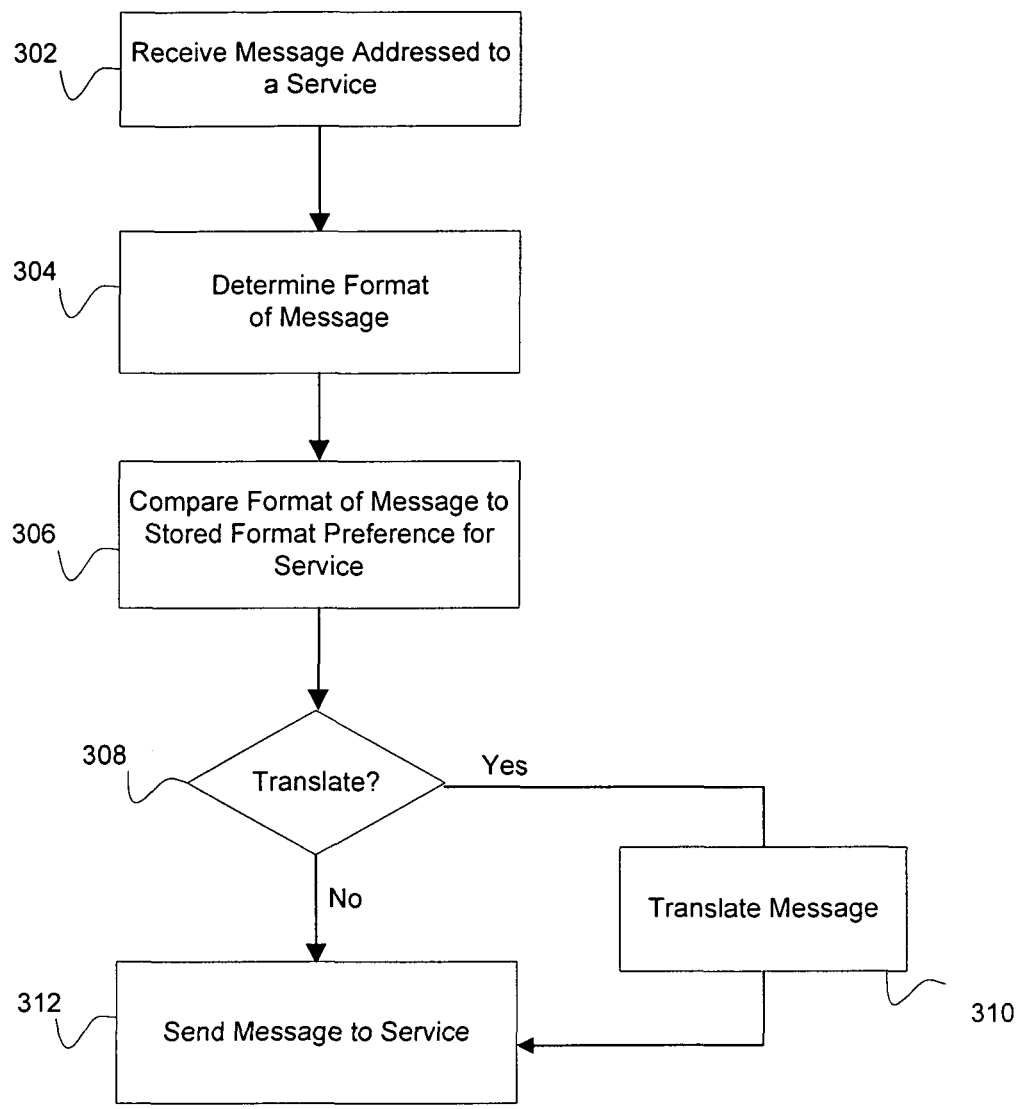
FIG. 3 is a flowchart illustrating a procedure for mediating a message sent to a particular service in accordance with one embodiment of the present invention.

FIG. 3 is a flow process diagram showing one example of a technique for mediating messages sent to a particular service through a message interchange network (e.g., 106 of FIG. 1). According to various embodiments, messages sent to the particular service may be received into the message interchange network from a variety of different entities including other services, hosts, network storage arrays, or terminals. The messages are sent to the message interchange network over a public network. At 302, the message interchange network receives a message addressed to a particular service. In the example of FIG. 1, service 110 sends a message to service 104. According to various embodiments, the message addressed to a particular service may include the particular address associated with the particular service. In other embodiments, the message merely includes some indicator associating the message with the provider of the particular service.

At 304, the format of the message is determined. In one example, determining the format may involve scanning the message to determine if formatting mechanisms such as DIME, MIME, SOAP, or AS2 are used. In some examples, multiple formatting mechanisms may be used. In an alternative embodiment, the format of the message may be presumed to be the same as the format preference specified for the sending service. However, a verification of the format is preferably performed by analyzing each particular message. At 306, the format of the message is compared to the stored format preference for the particular service (i.e., the receiving service). For example, if the format preference stored for the particular service indicates that the particular service should receive messages with DIME formatting and the message format is MIME, translation may be needed.

If it is determined that translation is necessary at 308, the message is translated at 310 and sent to the particular service at 312. If translation is not necessary at 308, the message is forwarded to the particular service at 312.

According to various embodiments, the techniques of the present invention recognize whether translation is necessary without a received message explicitly indicating that a translation is needed. Traditional mechanisms typically involve express requests for translation. In contrast, according to various embodiments of the present invention, a provider of a particular service need only specify the format of messages that the particular service is configured to receive. That is, the formatting used by other services (even services which access the particular service) need not be specified. Techniques of the present invention allow transparent translation of formats without involving user intervention.

Figure 4:
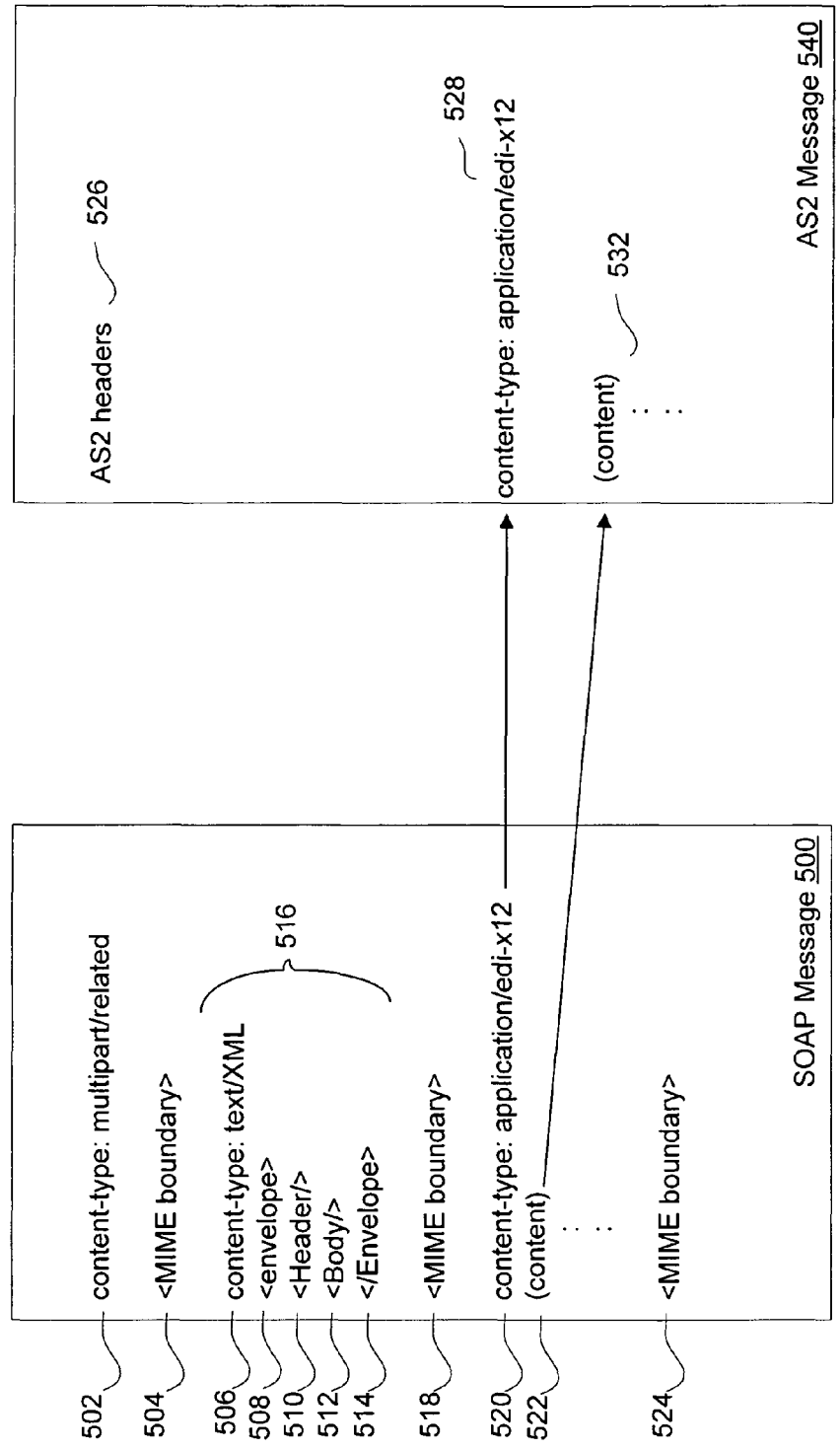
FIG. 4 is diagrammatic representation of a translation of a message from a SOAP format to an AS2 format in accordance with one embodiment of the present invention.

With reference to FIG. 4, shown is diagrammatic representation of a translation of a message from a SOAP format to an AS2 format in accordance with one embodiment of the present invention. The spacing shown for each message type is merely for clarity purposes and is not meant to accurately represent the formatting of actual SOAP and AS2 type messages. As shown, SOAP message 500 includes headers that provide various information such as the format of the message. In particular, content type 502 indicates that the message is multipart/related. Although not shown, other information can be provided in the headers as well. Next, SOAP message 500 includes a MIME boundary 504. Between MIME boundary 504 and 518, a SOAP envelope is included. The content type 506 of this bounded content is indicated as text/XML. The SOAP envelope contains a SOAP header 510 and a SOAP body 512. The content of the SOAP envelope as shown is exemplary only and does not reflect the actual variations and content possible for SOAP envelopes.

The SOAP message 500 further contains a second part between MIME boundaries 518 and 524. The content type 520 of these contents is indicated as application/edi-x12. The content 522 includes an X.12 EDI document. Other MIME headers beyond content type may be present as well. MIME boundary 524 marks the conclusion of these contents and can mark the beginning of another set of contents. Any number of sets of contents, separated by MIME boundaries, can be included in such a SOAP message 500. Other content types may include other types of text file formats, image file formats, video file formats, audio file formats, executable formats, etc. Alternatively, MIME boundary 524 can be a terminal boundary marking the end of the message.

In the present embodiment, when the SOAP message 500 is translated to AS2 message 540, the SOAP part 516 is stripped from the message and the headers 502 from SOAP message 500 are replaced with AS2 headers 526. In addition, a portion of SOAP message 500 between MIME boundary 518 and 524 is included in AS2 message 540 as follows: content type 520 in SOAP message 500 is included as content type 528 in AS2 message 540, and content 522 in SOAP message 500 is included as content 532 in AS2 message 540. Various MIME headers associated with the MIME part would also be included in the translated message. If SOAP message 500 contains additional contents (MIME parts) beyond boundary 524, those contents could also be transferred to the AS2 message, in which case the multiple parts of the AS2 message would be separated by MIME boundaries. Alternatively, each of the separate additional MIME parts of the SOAP message could be transformed into a separate AS2 message. The AS2 message 540 may furthermore contain an added digital signature, in which case the message would contain multiple parts separated by MIME boundaries.

In the present exemplary embodiment, SOAP message 500 is translated to AS2 message 540. It should be recognized that an AS2 message can also be translated to a SOAP message in other embodiments. In such an example, a SOAP part is added to the AS2 message so as to result in a SOAP message. The AS2 headers are replaced by headers appropriate to a SOAP message. The content type and content of the AS2 message is inserted as a MIME part following the SOAP MIME part in the resulting SOAP message. Any suitable number of AS2 message parts may also be combined into a single SOAP message with multiple MIME boundaries. Similarly, any message format can be translated to another message format in accordance with various embodiments of the present invention.

Figure 5:
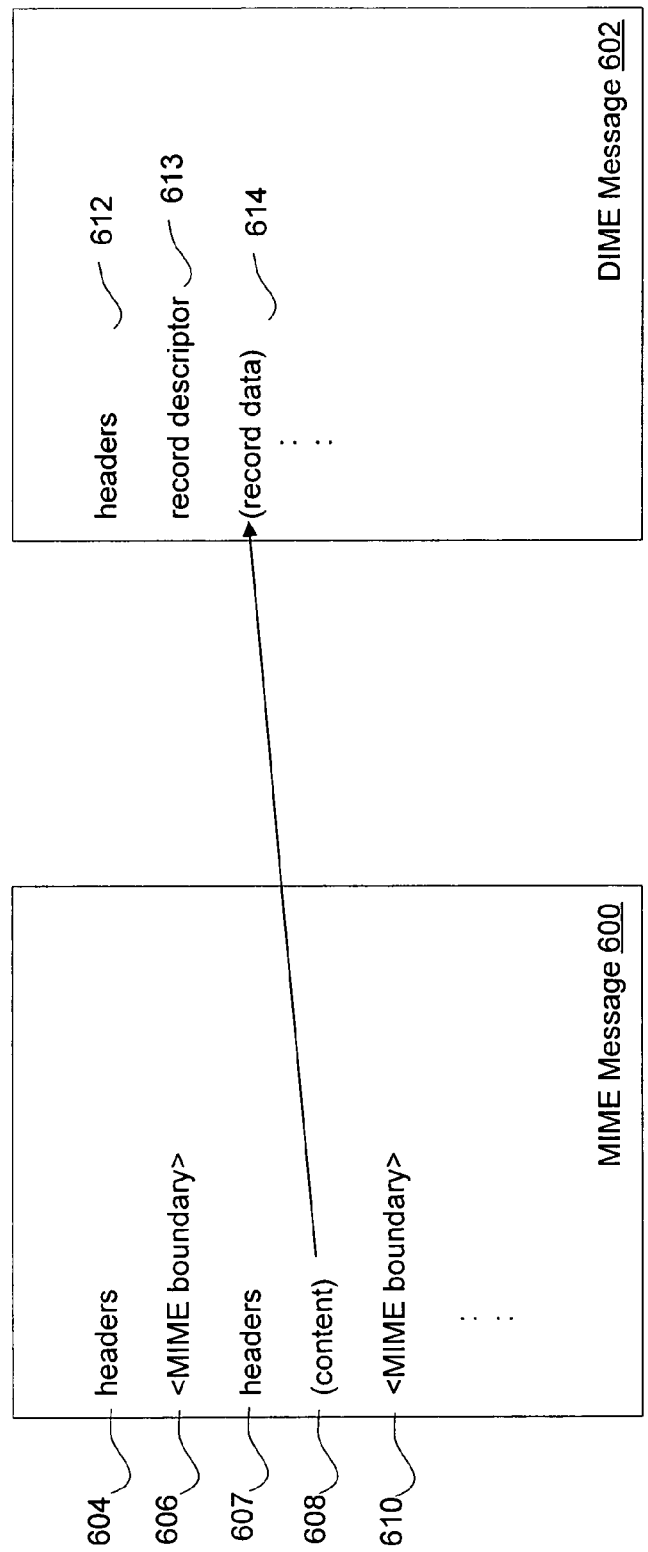
FIG. 5 is diagrammatic representation of a translation of a message from a MIME format to a DIME format in accordance with one embodiment of the present invention.

With reference to FIG. 5, shown is diagrammatic representation of a translation of a message from a MIME format to a DIME format in accordance with another embodiment of the present invention. The spacing shown for each message type is merely for clarity purposes and is not meant to accurately represent the formatting of actual MIME and DIME type messages. As shown, MIME message 600 includes headers 604 and MIME boundaries 606 and 610. Content 608 is located between MIME boundaries 606 and 610. Additional sets of contents and MIME boundaries can be included after MIME boundary 610 according to various embodiments.

In the present embodiment, when the MIME message 600 is translated to DIME message 602, headers 604 from MIME message 600 are translated to headers 612 in DIME message 602. In particular, a content type header in MIME message 600 may have a value of "multipart/related" but will have a value of "application/dime" in DIME message 602. Furthermore, the content type and content id headers 607 in the first MIME part of MIME message 600 are stored inside DIME record descriptor 613 inside DIME message 602. The content 608 of the MIME part is included as the DIME record data 614. The DIME record descriptor 613 includes information about the length of the content 614, so there is no need to include boundaries in a DIME message such as MIME boundaries to determine the beginning and end of a set of contents. MIME message 600 is parsed to determine the location of MIME boundaries 606 and 610. Once these boundaries are found, content 608 can be included as content 614, and information about the length of content 614, based on the distance between the boundaries or amount of information between the boundaries, can be included in record descriptor 613. Although the present embodiment includes content type and content ID in the MIME headers 607, it should be recognized that additional header information can also be included in various embodiments. Such additional header information may also be stored in the DIME message.

Although the present exemplary embodiment includes translating MIME message 600 to DIME message 602, it should be recognized that a DIME message can be translated into a MIME message in other embodiments. For example, information about the length of record data 614 that is stored in record descriptor 613 can be used to determine the placement of content 608 and MIME boundaries 606 and 610 in a MIME message 600. Similarly, any other message format can be translated to another message format according to various embodiments of the present invention.

Figure 6:
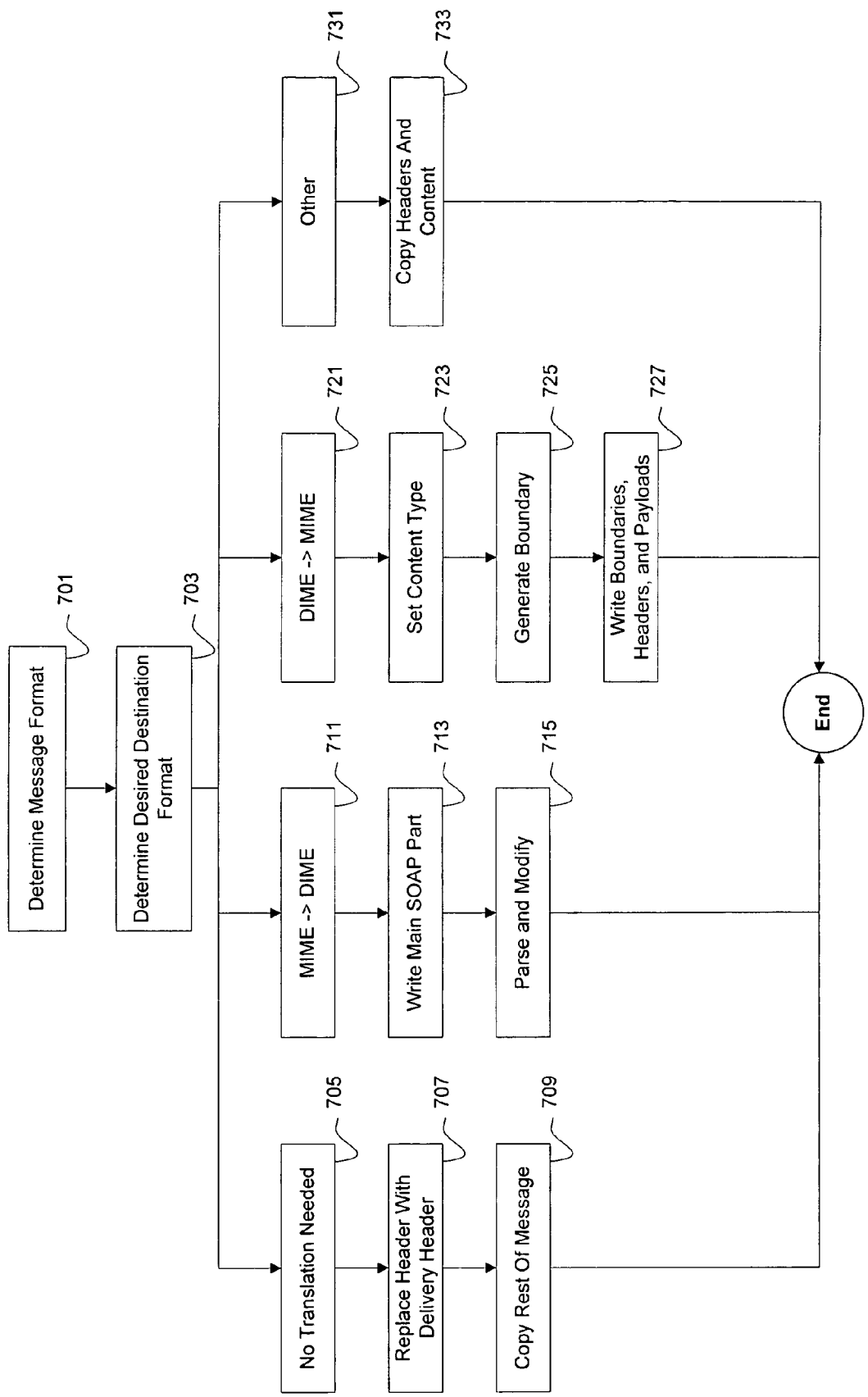
FIG. 6 is diagrammatic representation of a process for translating a message in accordance with one embodiment of the present invention.

FIG. 6 is a flow process diagram depicting one example of a technique for translating between formats. At 701, the message format of the received message is determined. According to various embodiments, the message format can be MIME, DIME, other, or the message can have no attachment formatting. In one example, the format is DIME if the content type is "application/dime" and MIME if the content type is "multipart/*" (where * can be a number of different types). Otherwise, the format may be neither. At 703, the desired format used by the destination service is determined. According to various embodiments, it may be determined that the desired format is the same as the format of the received message at 705. In this case, no translation is necessary, except that some headers or other SOAP parts may be altered and/or replaced at 707 as necessary to reflect an outgoing message from the message interchange network versus a message received into the network. At 709, the remaining message contents can be copied into the outgoing message in an unmodified manner without need for processing.

If it is determined that translation from MIME to DIME is needed at 711, the content type of the message is set to "application/dime." At 713, the main SOAP portion of the message is written as a record with desired content type information. At 715, attachments to the original message are parsed. For each attachment, a new DIME record copying only some MIME headers are written. In one example, Content-ID fields are unchanged when copied to a DIME format and Content-Type fields are also unchanged when copied to a DIME format. The type format field in the DIME record is set to MIME media type.

If the Content-Transfer-Encoding header is set for a MIME part, the content of the MIME part is decoded since DIME does not support transfer encoded record content. The content is then written in the decoded format. Next, if appropriate, the record can be chunked. DIME generally allows for a single part to be written as multiple records. Since DIME records declare their size in the beginning of the record, chunking allows for more optimal transmission of large amounts of data and streaming.

At 721, if it is determined that translation from DIME formatting to MIME formatting is needed, the content type for the new MIME message is set to "multipart/related", with proper boundary attribute, at 723. Next, a boundary for the MIME message to be composed is generated at 725, in order to separate the new MIME parts. For each portion of the message, boundaries, headers, and payloads are written at 727. In particular, each DIME record is parsed and a new MIME part is written for each record. This process involves 1) writing a MIME boundary, 2) writing MIME headers, 3) writing data content, and 4) writing another MIME boundary.

More specifically, once the first MIME boundary is written, the MIME headers are written. If the content-type is a MIME type, the content-type can be copied as-is. If content type is URI, then the content-type can be set to "text/xml." If the content-type is in some other form, then the content-type can be set to "application/octet-stream." In addition, if a content-ID is present, it can be left unchanged in the new message. If the record is not chunked, the content-length can be set to the size of the data record. Otherwise, if the record is chunked, then the content-length header may not be set.

Next, the data content of the record is written. In one example, if the data record is the first record (i.e., SOAP part), then the SOAP part may be parsed to replace SOAP headers used by the message interchange network. After the data content of the record is written, a second MIME boundary is written. If the data record is the last record, the MIME boundary is set as the closing boundary.

In the present embodiment, if it is determined that formatting is neither DIME nor MIME at 731, the message headers are copied unchanged at 733. According to various embodiments, the SOAP content is also copied, but the SOAP content is parsed in order to replace SOAP headers used by the message interchange network.

It should be noted that FIG. 6 describes one example of translation mechanisms for very specific formats. A variety of other formats and translation mechanisms are also available.

Figure 7:
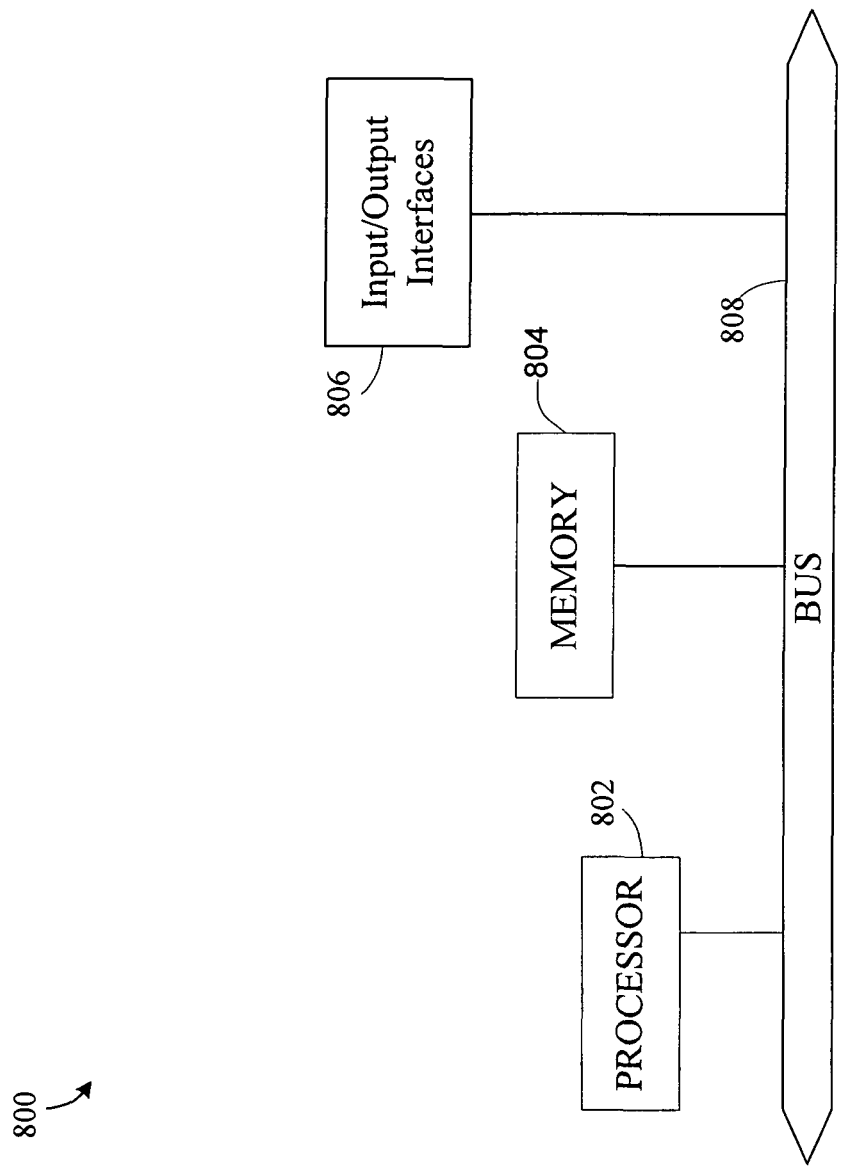
FIG. 7 is a diagrammatic representation of an example computer system in which embodiments of the present invention may be implemented.

Referring now to FIG. 7, a computer system 800 suitable for implementing the present invention includes a master central processing unit (CPU) 802, one or more memory 804, input and output interfaces 806, and a bus 808 (e.g., a PCI bus). When acting under the control of appropriate software or firmware, the CPU 802 is responsible for implementing various portions of the techniques of the present invention. It preferably accomplishes all these functions under the control of software including an operating system and any appropriate applications software. CPU 802 may include one or more processors such as a processor from the Motorola family of microprocessors or the MIPS family of microprocessors. In a specific embodiment, a memory 804 (such as non-volatile RAM and/or ROM) also forms part of CPU 802. However, there are many different ways in which memory could be coupled to the system. Memory block 804 may be used for a variety of purposes such as, for example, caching and/or storing data, programming instructions, etc.

The input and output interfaces 806 typically provide an interface to various I/O devices, such as mouse, keyboard, display, as well as providing an communication interface with other computer systems over a computer network. Among the communication interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM.

Although the system shown in FIG. 7 is one specific computer system of the present invention, it is by no means the only system architecture on which the present invention can be implemented.

Regardless of system's configuration, it may employ one or more memories or memory modules (such as, for example, memory block 804) configured to store data, program instructions for the general-purpose network operations and/or the inventive techniques described herein. The program instructions may control the operation of an operating system and/or one or more applications, for example. The memory or memories may also be configured to store information in a repository.

Because such information and program instructions may be employed to implement the systems/methods described herein, the present invention relates to computer program products, e.g., computer readable media that include program instructions, state information, etc. for performing various operations described herein. Examples of tangible computer readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:
1. A method for mediating messages within a message interchange network for facilitating communication among a plurality of entities, each entity having policy data corresponding thereto governing interaction with the entity via the message interchange network, the method comprising:
- a) receiving a format preference for a first service in the message interchange network, wherein the format preference specifies an expected format for messages received by such first service, the expected format from a group including MIME (Multipurpose Internet Mail Extensions), DIME (Direct Internet Mail Extensions), AS2 (Applicability Statement 2), and SOAP (Simple Object Access Protocol);
- b) storing the format preference in a repository associated with the message interchange network; and
- c) mediating messages sent to the first service using the format preference stored for the first service by receiving the messages,
   - determining a received format of the messages by inspecting at least one of the received messages,
   - translating the messages into the expected format specified by the format preference for the first service, and
   - sending the translated messages to the first service in the expected format, the translated messages having the specified message format.

2. The method of claim 1, wherein a second service sends messages to the first service via the message interchange network without specifying the format preference for the first service.

3. The method of claim 2, wherein a provider associated with the second service does not have information relating to the format preference of the first service.

4. The method of claim 1, wherein mediating messages further comprises:
   - comparing the format of the received message to the stored format preference associated with the first service;
   - translating the format of the received message into the format specified by the format preference if the format of the received message does not match the stored format preference associated with the first service.

5. The method of claim 4, further comprising repeating steps (a) through (c) for a plurality of services and a plurality of corresponding format preferences.

6. The method of claim 4, wherein the format of the received message is MIME (Multipurpose Internet Mail Extensions).

7. The method of claim 6, wherein the stored formatting preference associated with the first service is DIME (Direct Internet Mail Extensions).

8. The method of claim 7, wherein translating the received message from MIME to DIME further comprises setting a content type, parsing the received message and writing a new DIME record copying one or more MIME headers.

9. The method of claim 1, wherein messages are sent to the message interchange network via a public network.

10. The method of claim 9, wherein the public network is the Internet.

11. The method of claim 4, wherein the format of the received message is DIME.

12. The method of claim 11, wherein the stored formatting preference associated with the first service is MIME.

13. The method of claim 12, wherein translating the received message from DIME to MIME comprises setting a content type and writing MIME boundaries, headers, and payloads.

14. The method of claim 4, wherein the format of the received message is SOAP (Simple Object Access Protocol) and the stored format preference associated with the first service is AS2 (Applicability Statement 2).

15. The method of claim 14, wherein translating the received message from SOAP to AS2 comprises stripping a SOAP part from the received message.

16. The method of claim 15, wherein translating further comprises replacing SOAP message headers with AS2 message headers, setting content-type, and providing content between MIME boundaries.

17. The method of claim 4, wherein the format of the received message is AS2 and the stored format preference associated with the first service is SOAP.

18. The method of claim 4, wherein determining a received format associated with the message includes scanning the received message to determine the format.

19. The method of claim 4, wherein determining a received format associated with the received message is based on the format specified in a header of the encoded message.

20. The method of claim 4, wherein determining a received format associated with the received message is based on the second format preference associated with the second service.

21. The method of claim 1, wherein the repository is a database associated with a message interchange network.

22. The method of claim 1, wherein the first format preference is received over a network.

23. The method of claim 1, wherein the first format preference is input at the message interchange network.

24. The method of claim 23, wherein the format preference is input via a graphical user interface.

25. A computer system that mediates encoded messages within a message interchange network for facilitating communication among a plurality of entities, each entity having policy data corresponding thereto governing interaction with the entity via the message interchange network, the computer system comprising:
   - one or more processors;
   - one or more memory devices, wherein at least one of the processors and memory devices are adapted for:
   - a) receiving a format preference for a first service into the message interchange network, wherein the format preference specifies an expected format for messages received by such first service, the expected format from a group including MIME (Multipurpose Internet Mail Extensions), DIME (Direct Internet Mail Extensions), AS2 (Applicability Statement 2), and SOAP (Simple Object Access Protocol);
   - b) storing the format preference in a repository associated with the message interchange network; and
   - c) mediating messages sent to the first service using the format preference stored for the first service by receiving the messages,
      - determining a received format of the messages by inspecting at least one of the received messages,
      - translating the messages into the expected format specified by the format preference for the first service, and
      - sending the translated messages to the first service in the expected format, the translated messages having the specified message format.

26. The computer system of claim 25, wherein a second service sends messages to the first service via the message interchange network without specifying the format preference for the first service.

27. The computer system of claim 26, wherein a provider associated with the second service does not have information relating to the format preference of the first service.

28. The computer system of claim 25, wherein mediating messages further comprises:
   - comparing the format of the received message to the stored format preference associated with the first service;

translating the format of the received message into the format specified by the format preference if the format of the received message does not match the stored format preference associated with the first service.

29. The computer system of claim 28, wherein the format of the received message is MIME, DIME, AS2 or SOAP.

30. The computer system of claim 28, wherein the stored formatting preference associated with the first service is MIME, DIME, AS2 or SOAP.

31. The computer system of claim 25, wherein messages are sent to the message interchange network via a public network.

32. The computer system of claim 31, wherein the public network is the Internet.

33. The computer system of claim 28, wherein determining a received format associated with the message includes scanning the received message to determine the format.

34. The computer system of claim 28, wherein determining a received format associated with the received message is based on the format specified in a header of the encoded message.

35. The computer system of claim 28, wherein determining a received format associated with the received message is based on the second format preference associated with the second service.

36. The computer system of claim 25, wherein the first format preference is received over a network.

37. The computer system of claim 25, wherein the first format preference is input at the message interchange network via a graphical user interface.

38. A computer program product for mediating encoded messages within a message interchange network for facilitating communication among a plurality of entities, each entity having policy data corresponding thereto governing interaction with the entity via the message interchange network, the computer program product comprising: at least one tangible computer readable medium; computer program instructions stored within the at least one computer readable product configured for:
   a) receiving a format preference for a first service into the message interchange network, wherein the format preference specifies an expected format for messages received by such first service, the expected format from a group including MIME (Multipurpose Internet Mail Extensions), DIME (Direct Internet Mail Extensions), AS2 (Applicability Statement 2), and SOAP (Simple Object Access Protocol);
   b) storing the format preference in a repository associated with the message interchange network; and
   c) mediating messages sent to the first service using the format preference stored for the first service by receiving the messages,
      determining a received format of the messages by inspecting at least one of the received messages,
      translating the messages into the expected format specified by the format preference for the first service, and
      sending the translated messages to the first service in the expected format, the translated messages having the specified message format.

39. The computer program product of claim 38, wherein a second service sends messages to the first service via the message interchange network without specifying the format preference for the first service.

40. The computer program product of claim 39, wherein a provider associated with the second service does not have information relating to the format preference of the first service.

41. The computer program product of claim 38, wherein mediating messages further comprises:
   comparing the format of the received message to the stored format preference associated with the first service;
   translating the format of the received message into the format specified by the format preference if the format of the received message does not match the stored format preference associated with the first service.

42. The computer program product of claim 41, further comprising repeating steps (a) through (c) for a plurality of services and a plurality of corresponding format preferences.

43. The computer program product of claim 41, wherein the format of the received message is MIME.

44. The computer program product of claim 43, wherein the stored formatting preference associated with the first service is DIME.

45. The computer program product of claim 44, wherein translating the received message from MIME to DIME further comprises setting a content type, parsing the received message and writing a new DIME record copying one or more MIME headers.

46. The computer program product of claim 38, wherein messages are sent to the message interchange network via a public network.

47. The computer program product of claim 46, wherein the public network is the Internet.

48. The computer program product of claim 41, wherein the format of the received message is DIME.

49. The computer program product of claim 48, wherein the stored formatting preference associated with the first service is MIME.

50. The computer program product of claim 49, wherein translating the received message from DIME to MIME comprises setting a content type and writing MIME boundaries, headers, and payloads.

51. The computer program product of claim 41, wherein the format of the received message is SOAP and the stored format preference associated with the first service is AS2.

52. The computer program product of claim 51, wherein translating the received message from SOAP to AS2 comprises stripping a SOAP part from the received message.

53. The computer program product of claim 52, wherein translating further comprises replacing SOAP message headers with AS2 message headers, setting content-type, and providing content between MIME boundaries.

54. The computer program product of claim 41, wherein the format of the received message is AS2 and the stored format preference associated with the first service is SOAP.

55. The computer program product of claim 41, wherein determining a received format associated with the message includes scanning the received message to determine the format.

56. The computer program product of claim 41, wherein determining a received format associated with the received message is based on the format specified in a header of the encoded message.

57. The computer program product of claim 41, wherein determining a received format associated with the received message is based on the second format preference associated with the second service.

58. The computer program product of claim 38, wherein the repository is a database associated with a message interchange network.

59. The computer program product of claim 38, wherein the first format preference is received over a network.

60. The computer program product of claim 38, wherein the first format preference is input at the message interchange network.

61. The computer program product of claim 60, wherein the format preference is input via a graphical user interface.

* * * * *